May 28, 1957

L. N. WALTER 2,793,638

HEATING DEVICE, PARTICULARLY FOR HOT
AIR HEATING SYSTEMS

Filed Sept. 22, 1954

INVENTOR.
LEO N. WALTER
BY

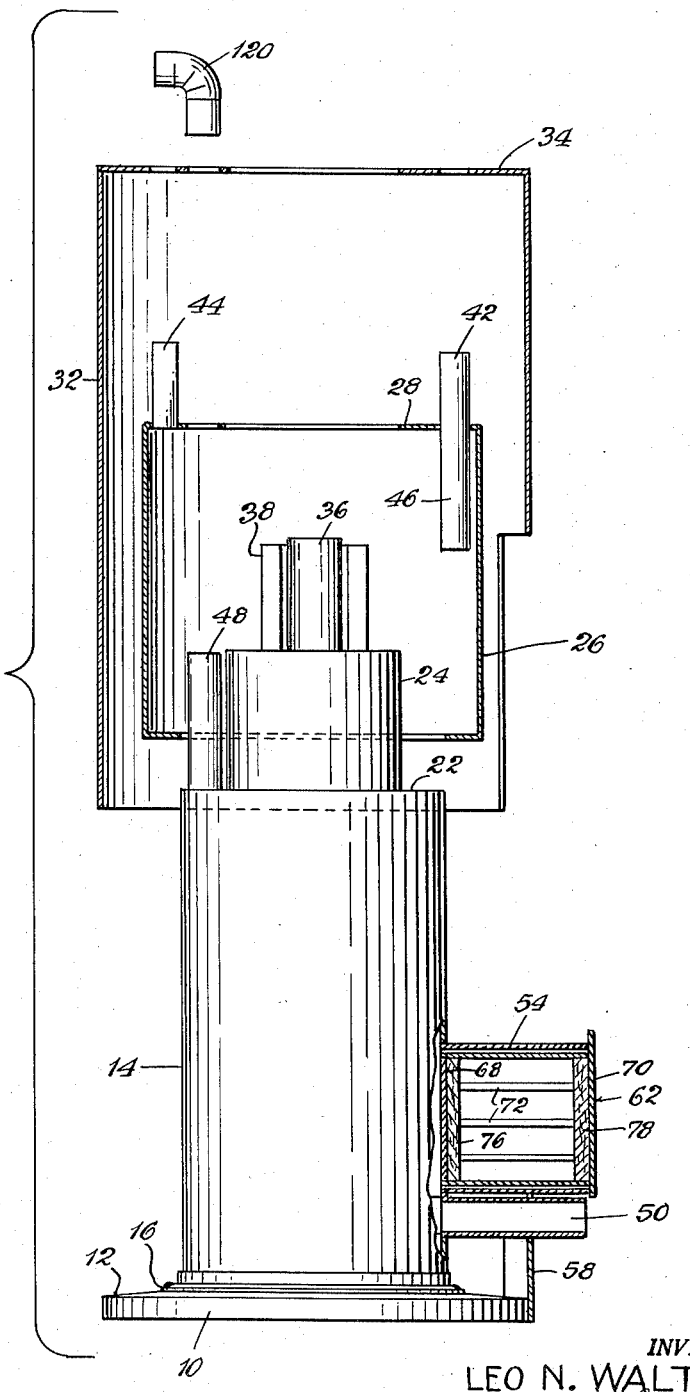

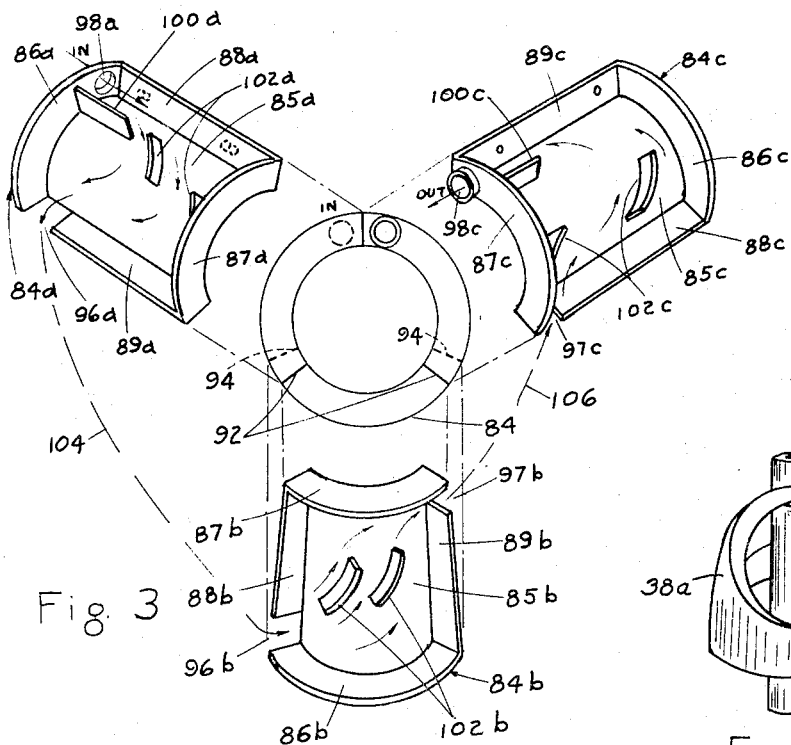
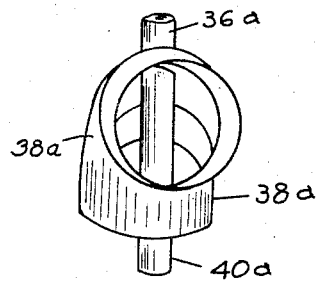
Fig. 6
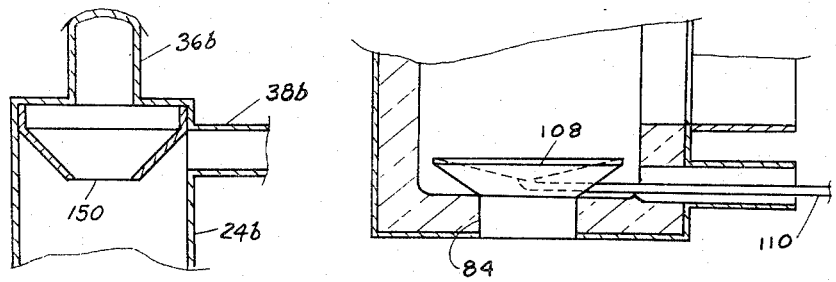
Fig. 5    Fig. 4
INVENTOR.
LEO N. WALTER

United States Patent Office 2,793,638
Patented May 28, 1957

2,793,638

HEATING DEVICE, PARTICULARLY FOR HOT AIR HEATING SYSTEMS

Leo N. Walter, Lansing, Ill.

Application September 22, 1954, Serial No. 457,591

6 Claims. (Cl. 126—106)

This invention relates to an improved heating device, particularly for hot air heating systems.

An object of the invention is to provide a novel type of heater of greatly improved efficiency.

Another object of the invention is to provide a novel heating device of the kind referred to in which practically any kind of heat producing means may be employed, such as gas, oil, electricity, etc.

A further object of the invention is to provide a heating device of the type indicated, in which air is blown into separate sealed compartments of the heating device and discharged separately from said compartments.

Still another object of the invention is to provide a heating device of the type indicated in which the air blown into one of said separate compartments is caused to impinge centrally upon a very hot surface and to be deflected by said surface outwardly and upwardly along the side walls of said compartment under great expansion towards a discharge opening in the upper part of said compartment.

Another object of the invention is to provide a heating device of the type indicated in which one compartment is surrounded, in operation, by a space in which hot gases are being circulated, another of said compartments surrounding said gas space at the top and downwards therefrom on all sides.

A further object of the invention is to provide a heating device of the type indicated in which said gas space between said two compartments is at least partly provided with baffles causing the hot gases to circulate through said space along a definite path designed to ensure the best possible utilization of the heat of said gases.

Another object of the invention is to provide a heating device of the type indicated in which the member forming the outer wall of an outer compartment is provided with a circumferential inwardly extending flange forming the bottom wall of the compartment and loosely fitting around the outer wall of said gas space so that said outer wall of said compartment may readily be slid into and out of position from above.

Still another important object of the invention is to provide a heating device of the type indicated in which the air blown into the said compartments is permitted to expand to a great extent, whereby a greatly increased volume of heated air is obtained which makes it possible to use a blower of relatively low capacity.

An embodiment of the invention is shown in the accompanying drawings, in which

Fig. 2 is an exploded view of the heater.

Fig. 3 shows an exploded view of a preferred baffle arrangement in the heater.

Figs. 4 and 5 are sectional views of detail arrangements, and

Fig. 6 is a perspective view of a modified detail.

Figure 1:
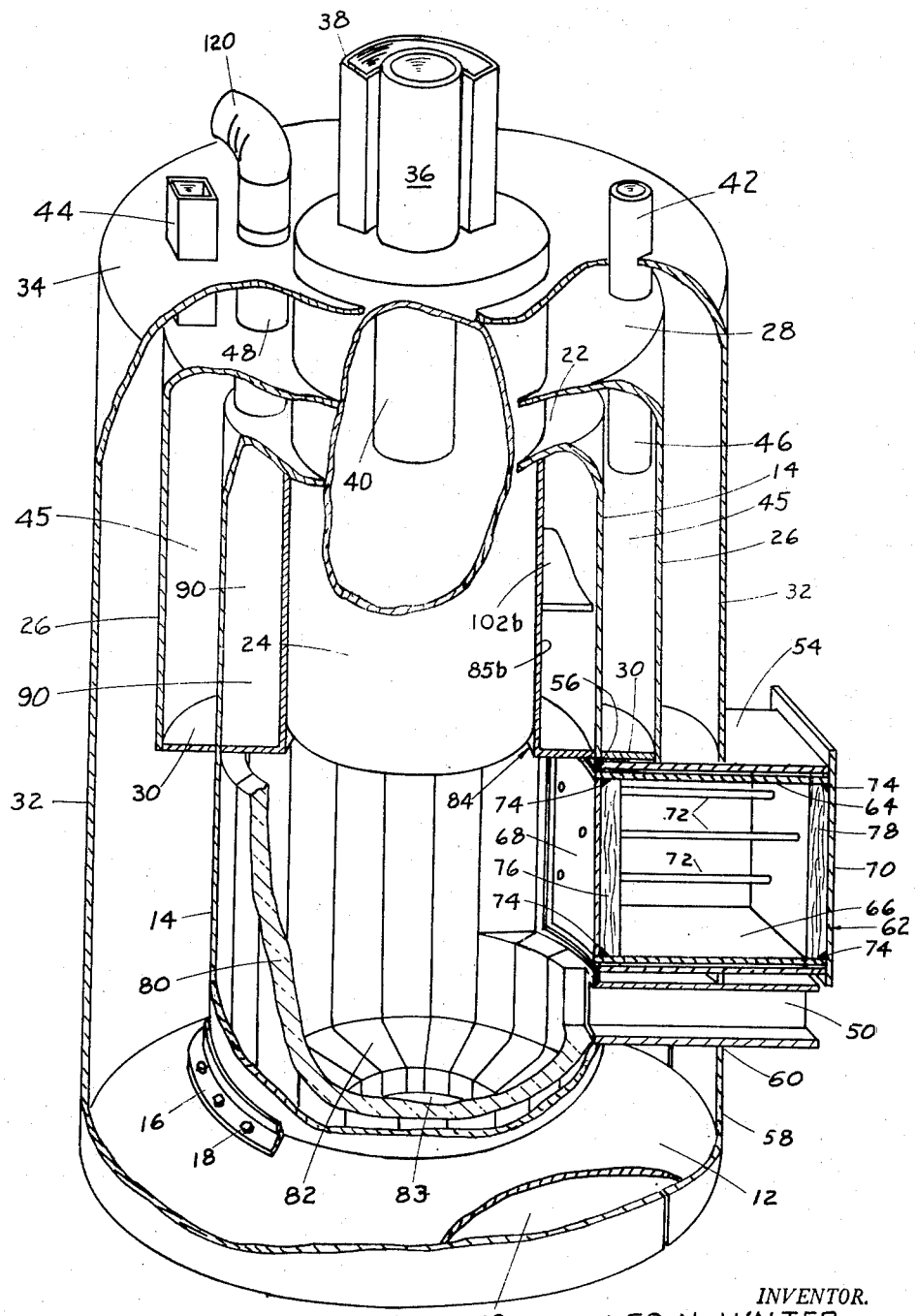
Fig. 1 is a substantially vertical section through a heater according to the invention.

In the embodiment shown in Fig. 1, the heater comprises a base plate 10 on which an asbestos sheet 12 is placed. A cylindrical member 14 of smaller diameter than the base plate 10 is mounted vertically on said base plate 10 and asbestos sheet 12 and secured thereto by any suitable means such as an angle iron 16 and bolts 18. The cylindrical member 14 is closed at its top by a horizontal wall 22 and in an opening in said top wall 22 a second cylindrical member 24 is secured, as by welding, said second cylindrical member 24 being closed at its bottom. The cylindrical member 24 is concentric with the cylindrical member 14 and extends downwards and upwards from the horizontal wall 22. The bottom end of said member 24 is spaced a considerable distance above the base plate 10.

A third cylindrical member 26 is disposed concentrically around the member 14 and extends downwardly approximately as far as the member 24. Said third cylindrical member 26 has a horizontal top wall 28 disposed at some distance above the top wall 22 of the member 14. At its bottom end, the member 26 is provided with a flange 30 extending inwardly into engagement with the outside of the member 14. The entire structure comprising the three cylindrical members 14, 24, 26 is surrounded by a cabinet 32 which, in the embodiment illustrated also is cylindrical and concentric with the member 14. Said cabinet 32 is secured to the base plate 10 by any suitable means, not shown, and has a horizontal top wall 34 disposed at some distance above the top wall 28 of the member 26. The member 24 extends upwards through said top walls 28 and 34.

Two ducts 36 and 38 are secured, as by welding, to the top wall of the member 24. One of said ducts 36 has a lower end portion 40 which extends for some distance into the interior of the member 24. Another pair of ducts 42 and 44 extend from the outside of the heater through the top walls 34 and 28 and are secured, as by welding, to the last-mentioned top wall 28, thus providing communication into the annular space 45 between the members 14 and 26. The duct 42 has an end portion 46 which projects some distance downwards into said annular space 45. A smoke stack 48 is secured, as by welding, to the edges of an aperture in the top wall 22 and extends upwardly through the top walls 28 and 34. The purpose of said various ducts and of said smoke stack 48 will be explained below.

Adjacent the bottom of the cylindrical member 14, said member 14 is provided with an aperture to the edges of which is secured, as by welding, a conduit 50 which extends horizontally outwards. Immediately above the conduit 50 and below the flange 30 of the cylindrical member 26, the cylindrical members 14 and 32 are provided with registering apertures through which a duct 54, forming an access opening, extends which is secured, as by welding at 56, to the member 14. The portion 58 of the member 32 disposed below said duct 54 is removable and secured in place by any suitable means, such as latches, not shown. Said removable portion 58 is provided with an aperture 60 for the duct 50.

In the duct 54, a unit 62 forming a removable closure means is disposed which comprises top and bottom plates 64 and 66, respectively, secured together at the inner and outer ends thereof by inner and outer end plates 68 and 70, respectively, which in turn are connected together by tie rods 72. The plates 68, 70 are preferably secured to the plates 64, 66 by welding, as indicated at 74. Opposing sides of the plates 68, 70 are covered with insulating material 76 and 78, respectively. The unit 62 is removably secured in place by any suitable means, not shown, such as bolts, latches, etc.

The inside of the cylindrical member 14 is lined with fire resistant material 80 up to a level approximately coinciding with the flange 30. Said fire resistant material also covers the base, as at 82, within said member 14, leaving a circular space 83 in the center uncovered. The inside of the plate 68 is also left uncovered by the fire resistant material.

On top of the fire resistant material 80, baffle units, generally indicated 84, are positioned. Said baffle units 84 are shown in detail on a decreased scale in Fig. 3. The middle view in said Fig. 3 shows the baffle unit in horizontal projection, while the three members 84a, 84b, and 84c are shown separately in a perspective view from above and from the outside in the three surrounding views.

Each of the members 84a, 84b, 84c consists of an inner wall 85a, 85b, 85c forming part of a cylinder with an inner diameter substantially equal to the outer diameter of the cylindrical member 24. Each of said walls 85a, 85b, 85c has a bottom flange 86a, 86b, 86c, a top flange 87a, 87b, 87c, and side flanges 88a, 88b, 88c and 89a, 89b, 89c, all extending radially outwards from said inner walls 85a, 85b, 85c. Said flanges have a width substantially corresponding to the width of the space 90 between the members 14 and 24. When the baffle units 84 are inserted in the space 90, the side flanges 88a, 89c are vertical, while the other side flanges are inclined as indicated particularly by the lines 92 and 94 in the middle view of Fig. 3.

The side flanges 89a and 88b are provided with registering apertures 96a, 96b adjacent the bottom thereof. Similarly, the flanges 89b and 88c are provided with registering apertures 97b and 97c adjacent the top thereof. The bottom flange 86a has an aperture 98a providing communication with the lower portion of the interior of the member 14. Similarly, the top flange 87c has an aperture 98c which, when the baffle units are in position in the heater, is disposed right below the smoke stack 48 and provides communication therewith. A number of baffles 100a, 100c, 102a, 102b, 102c extend at different angles from the walls 85a, 85b, 85c and have the same width as the various flanges. The various baffles and flange apertures provide a continuous path from the aperture 98a to the aperture 98c through the three baffle units 84a, 84b, 84c, as indicated by the arrows within the baffle units and the dotted lines 104, 106 between the same. Burners or electric heating elements, not shown, of any desired kind may be disposed in the lined space below the member 24 and, in the case of fluid burners, an overflow collector 108, Fig. 4, may be disposed in the space 84 and provided with an overflow pipe 110 extending to the outside of the heater. Any kind of known means, not shown, for regulating the admission of air through the duct 50 may be provided.

In operation, combustion gases generated by the burners, or air heated by the electric heating elements, as the case may be, fills the space below the member 24 and the baffle units 84. In the following, said gases or air will be termed hot gases for simplicity of reference. Said hot gases enter the aperture 98a and flow through the baffle unit 84 substantially following the circuitous path indicated by the arrows and the dotted lines 104, 106 to the outlet aperture 98c and the smoke stack 48 and further out through a chimney, not shown. Obviously, the arrangement of the apertures 96a, 96b, 97b, 97c and the various baffles in the baffle unit 84 is such as to compel the hot gases to flow in close contact with every portion of the member 14 above the bottom flanges of the baffle unit 84 and with every portion of the walls 85a, 85b, 85c which are in engagement with the member 24. Therefore, said portions of the members 14 and 24 are thoroughly heated and substantially all the heat contents of the hot gases have been utilized when said gases leave the baffle unit 84 through the aperture 98c.

The heat thus transmitted through the walls of the members 14, 24 is absorbed by air circulated through the interior of the member 24 and through the space 45 as will now be explained. By means of a blower, not shown, air is forced through the duct 36, 40 into the interior of the member 24 with such velocity that the incoming stream of air impinges upon the bottom of said cylindrical member 24 which, of course, is heated to a comparatively high temperature by the aforementioned hot gases. At said bottom, the air spreads out towards the sides and flows upwards in close contact with the heated side wall of the member 24 and out through the duct 38 to spaces, not shown, to be heated, such as rooms in a building. The extension 40 of the duct 36 serves to ensure that the incoming air reaches the bottom of the member 24 as a fairly confined stream and that the upwardly flowing air in the member 24 is forced to leave through the duct 38 at the top of said member 24.

The abovementioned blower, or a separate blower, is connected to the duct 42 and forces air into the space 45 where the stream of air impinges upon the flange 30 and is forced out by the same to both sides, whereupon it follows devious unregulated paths through said space 45 to the duct 44 which leads to the same spaces, not shown, as the duct 38 or to other such spaces, as is well known in the art. The space between the outside of the members 14, 26 and the cabinet 32 as well as between the horizontal walls 28 and 34 may be entirely or partly filled with heat insulating material, not shown.

In a heater of a certain size according to my Patent 2,642,857, a maximum of about 30,000 B. t. u./hr. can be absorbed by the circulating air. Comparative tests on a heater of the same size but constructed according to the present invention have shown that the air circulated through the last-mentioned heater is capable of absorbing up to 70,000 B. t. u./hr. without increase of the blower capacity. It had been established that the violent expansion of the air in the inner chamber was the main cause of the increased efficiency of my previous heater, described in the above-mentioned patent, but it could not be foreseen that the conversion of the outer air space 45 to the same principle of operation would result in such a remarkable increase in effect of the heater. The main reason that this result could not be foreseen is that the bottom surface (flange 30) of said outer air chamber is not subjected to heat of anywhere near the intensity of the heat acting on the bottom surface of the member 24. The surprising effect is further accentuated by the fact that the actual heat transfer area in my present structure is considerably less than in a heater of the same size according to my above-mentioned patent where the space corresponding to space 45 in my present application extends all the way to the bottom of heater.

The intensive expansion of the air in the heating chambers can be noted by comparison of the air volumes at the intake and output of the blower before and after the heat is turned on. With one particular blower running at constant speed, the following values were obtained:

Intake cold—98.5 cu. ft./hr. \
Intake hot—80.2 cu. ft./hr. } Decrease 18.3 cu. ft./hr.

Output cold—109.9 cu. ft./hr. \
Output hot—134. cu. ft./hr. } Increase 24.1 cu. ft./hr The arrangement of sealed air heating chambers inside and outside the concentrated baffle system in the space 90 makes for an extremely efficient and fast absorption of the heat in the hot gases by the air circulated through both said air heating chambers.

Another advantage of my invention is that the structure described above permits removal of the member 32 by simply sliding it upwards (after removal of pipe bends, such as 120) on the member 24 and the ducts 42, 44 and 48. The member 26 can then, or simultaneously, be removed in a similar manner by sliding it upwards on the members 24 and 14 and the smoke stack 48 as indicated in Fig. 2. The interior of the member 14 is accessible upon removal of the unit 62. Thus every part of the heater is readily accessible for inspection or repair. The unit 62 provides a safety measure against explosions in operation, its securing means being dimensioned to yield at a lower pressure than the member 14.

Fig. 5 shows an arrangement of the inlet and outlet of the member 24b (corresponding to member 24 in Fig. 1) which is particularly useful in cases where a fan is used instead of a blower. The air from the fan enters through pipe 36b and is concentrated towards the bottom of member 24b by means of the funnel 150. The outlet 38b is preferably on the side of member 24b in this case.

Fig. 6 shows an alternative arrangement of the ducts 36a, 40a, and 38a communicating with the interior of the member 24, said ducts corresponding to the ducts 36, 40 and 38 in Fig. 1, respectively.

It should be understood that the embodiment shown in the drawings is intended as an example only and not as a limitation, various modifications of shape and arrangement being feasible without departure from the scope and spirit of my invention as defined in the appended claims.

What I claim is:

1. In a forced draft hot-air heating system, first means defining an inner air heating chamber, second means surrounding at least the lower portion of said inner air heating chamber and defining between said first means and said second means and below said inner air heating chamber a heat supply space adapted to contain heat producing means, third means defining an outer air heating space surrounding said heat supply space between said first means and said second means and extending across the top of said second means, said third means enclosing an outer air heating chamber, bottom means closing said outer air heating chamber approximately at the level of the bottom of said inner air heating chamber, separate air inlet conduits to said inner and outer air heating chambers, said air inlet conduits extending through the top of said inner and outer air heating chambers a distance within said chambers towards the bottom thereof, and separate air outlet conduits extending outside said chambers from the top thereof, whereby air can be forced in a confined stream through said inlet conduits and caused to impinge upon the bottom of said air heating chambers to be heated, expanded and diverted towards said outlet conduits substantially without disturbing said confined incoming air streams.

2. The system as set forth in claim 1, wherein the means forming said inner air heating chamber extends through and above the top of said heat supply space and the top of said outer air heating space and is sealingly secured to said second means at the top of said heat supply space.

3. The system as set forth in claim 1, wherein said air inlet and outlet conduits of the inner air heating chamber comprise pipes sealingly secured to the top wall of said inner air heating chamber, and said air inlet and outlet conduits of the outer air heating chamber comprise pipes sealingly secured to the top of said outer air heating chamber, while said third means together with its said pipes and its bottom forms a separate unit loosely mounted in place and removable by sliding movement upwards.

4. The system as set forth in claim 1, including a cabinet surrounding said three chambers on all sides and provided with a top having apertures for said conduits therein.

5. The system as set forth in claim 1, including baffle means in said heat supply space between said first and second means to provide a controlled path of movement of the heat supply medium in said space.

6. In a forced air heater, a first cylindrical member, bottom and top closure members on said first cylindrical member, an air inlet pipe in said top closure member sealingly secured thereto and extending centrally downwards below said top closure member, there being an air outlet formed in said top closure member eccentrically thereof, a second cylindrical member surrounding at least the lower portion of said first cylindrical member at a distance outwards thereof and extending downwards below said first cylindrical member to a base plate, a top closure member of said second cylindrical member sealingly secured to said first cylindrical member and forming with said second cylindrical member and base plate a heat supply chamber having an access opening below said first cylindrical member, removable closure means for said access opening, a smoke stack secured to said top closure member of the second cylindrical member and extending upwards therefrom, a third cylindrical member surrounding said second cylindrical member at a distance therefrom, a top closure member on said third cylindrical member, a bottom flange on said third cylindrical member extending inwardly into engagement with said second cylindrical member approximately at the level of the bottom of said first cylindrical member and defining together with said third cylindrical member and top closure member thereof a second air chamber around the top portion of said second cylindrical member, an inlet pipe secured to said top closure member of the third cylindrical member and extending downwardly into said second air chamber, an outlet pipe secured to said top closure member of the third cylindrical member and extending upwards therefrom at a point approximately diametrically opposite said last-mentioned inlet pipe, a cabinet enclosing said second and third cylindrical members and at least the main portion of said first cylindrical member, there being an access opening formed in said cabinet aligned with said access opening below said first cylindrical member, whereby air forced in through said inlet pipes is caused to flow in comparatively confined streams into said first and second air chambers, to impinge on the bottom of said first air chamber and the bottom flange of said second air chamber, to be deflected and expand violently, and to be discharged through said outlet pipes to spaces to be heated.

References Cited in the file of this patent
UNITED STATES PATENTS

| | | |
|---|---|---|
| 652,555 | Brooke | June 26, 1900 |
| 2,462,395 | Heiman | Feb. 22, 1949 |
| 2,478,069 | Walter | Aug. 2, 1949 |
| 2,518,629 | Melton | Aug. 15, 1950 |
| 2,642,857 | Walter | June 23, 1953 |